United States Patent Office 3,386,990
Patented June 4, 1968

3,386,990
AZO DYES CONTAINING VINYLSULFONYLETHYL TETRAHYDROQUINOLINE GROUPS
John I. Dale III, James M. Straley, and Max A. Weaver, Kingsport, Tenn., assignors to Eastman Kodak Company, Rochester, N.Y., a corporation of New Jersey
No Drawing. Filed Oct. 4, 1965, Ser. No. 492,923
13 Claims. (Cl. 260—155)

ABSTRACT OF THE DISCLOSURE

Water-insoluble benzene-azo-tetrahydroquinoline compounds containing a vinylsulfonyl ethyl group are useful as dyes for hydrophobic textile materials.

---

This invention relates to novel, water insoluble azo compounds containing a vinylsulfonylethyl tetrahydroquinoline radical, and more particularly to azo compounds, such as azo dyestuffs, containing such radical. Particular azo compounds containing the vinylsulfonylethyl tetrahydroquinoline radical include compounds obtained by coupling diazotized anilines with vinylsulfonylethyl tetrahydroquinoline coupling components.

The azo compounds of the invention have the general formula (I)

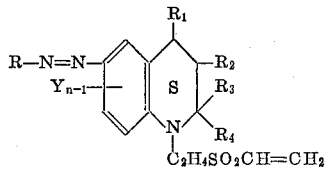

wherein R represents a monocyclic carbocyclic aromatic group of the benzene series including phenyl and substituted phenyl such as lower alkylphenyl, e.g. o,m,p-tolyl; lower alkoxyphenyl, e.g. o,m,p-methoxyphenyl; halophenyl, e.g. o,m,p-chlorophenyl; nitrophenyl, e.g. o,m,p-nitrophenyl, lower alkylsulfonylphenyl, e.g. o,m,p-methylsulfonylphenyl; lower alkylsulfonamidophenyl e.g. o,m,p-methylsulfonamidophenyl; lower di(alkylsulfonyl)phenyl, e.g. 2,5-di(methylsulfonyl)phenyl; dicarboxylicacidimidophenyl, e.g. o,m,p-succinimidophenyl; fluoroalkylphenyl, e.g. trifluoromethylphenyl; lower alkanoylamidophenyl, e.g. o,m,p,-acetamidophenyl; lower alkanoylphenyl, e.g. p-acetylphenyl; cyanophenyl, e.g. o,m,p-cyanophenyl; carbamoylphenyl, e.g. o,m,p-carbamoylylphenyl; benzamidophenyl; thiocyanophenyl, e.g. o,m,p-thiocyanophenyl; lower alkylthiophenyl, e.g. o,m,p-methylthiophenyl; benzoxyphenyl, e.g. o,m,p-benzoxyphenyl; benzylaminophenyl, e.g. o,m,p-benzylaminophenyl; N-alkylbenzaminophenyl, e.g. N-phenylmethylaminophenyl; formylphenyl, e.g. o,m,p-formylphenyl; lower carbalkoxyphenyl, e.g. o,m,p-carbethoxyphenyl; benzoylphenyl, e.g. o,m,p-benzoylphenyl.

$R_1$, $R_2$, $R_3$ and $R_4$ each represent a hydrogen atom or a lower alkyl group, particularly methyl;

$Y_{n-1}$ represents the substituents in at least one of the 5-, 7- or 8-positions of the tetrahydroquinoline nucleus wherein Y is either a lower alkyl group, particularly methyl; a lower alkoxy group, particularly methoxy; or a halogen atom, including a chlorine atom or a bromine atom;

$n$=a positive integer from 1 to 4.

The vinylsulfonylethyl tetrahydroquinoline coupling components of the invention which are coupled with the azo compounds have the following general formula (II)

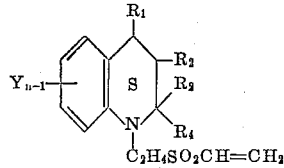

wherein $R_1$, $R_2$, $R_3$, $R_4$, Y and $n$ have the same meaning as given above.

Exemplary vinylsulfonylethyl tetrahydroquinolines of the above general formula include, for example, N-vinylsulfonylethyl-1,2,3,4-tetrahydroquinoline
N-vinylsulfonylethyl-2,2,4-trimethyl-1,2,3,4-tetrahydroquinoline
N-vinylsulfonylethyl-2,2,4,7-tetramethyl-1,2,3,4-tetrahydroquinoline
N-vinylsulfonylethyl-2,7-dimethyl-1,2,3,4-tetrahydroquinoline The coupling components are prepared by the reaction of the appropriately substituted tetrahydroquinoline with divinyl sulfone in the presence of acetic acid and an inert solvent as will be more particularly described hereinafter.

The azo compounds can be used for dyeing textile materials including synthetic polymer fibers, yarns and fabric giving fast, brilliant blue to yellow shades when applied by conventional dyeing methods to protein synthetic fibers such as cellulose acetate, nylon, polyesters, modacrylics, etc. The azo compounds have excellent affinity for polyamide fibers. When the azo compounds are used for dyeing hydrophobic materials, they should be free of water-solubilizing groups such as sulfo and carboxyl groups. In general, the dyes have good fastness, for example, to light, washing, gas (atmospheric fumes) and sublimation.

The following examples will serve to illustrate the preparation of respresentative intermediates and azo compounds of our invention.

PREPARATION OF VINYLSULFONYLETHYL TETRAHYDROQUINOLINE COUPLERS

Preparation of 2,7-dimethyl-1(2-vinylsulfonylethyl)-1,2,3,4-tetrahydroquinoline.

An amount of 80.5 g. 2,7-dimethyl-1,2,3,4-tetrahydroquinoline, 65 g. divinylsulfone, 200 ml. toluene, and 10 ml. acetic acid were heated together at reflux for 24 hr. The solvent was removed and the product, distilled under vacuum, had a B.P. of 199–207° C. at 1.1 to 1.15 mm. Hg.

The coupler has the structure:

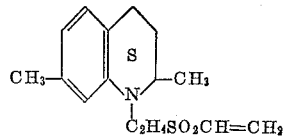

In accordance with the method set forth above, the following table describes the coupling components which were prepared by reacting the appropriate 1,2,3,4-tetrahydroquinoline with divinylsulfone.

TABLE

| Tetrahydroquinoline Reactant | Structure |
|---|---|
| 2,2,4,7-tetramethyl-1-(2-vinylsulfonylethyl)-1,2,3,4-tetrahydroquinoline. | |
| 1-(2-vinylsulfonylethyl)-1,2,3,4-tetrahydroquinoline. | |
| 7-methoxy-1-(2-vinylsulfonylethyl)-1,2,3,4-tetrahydroquinoline. | |
| 7-chloro-1-(2-vinylsulfonylethyl)-1,2,3,4-tetrahydroquinoline. | |

The dyes of the invention are prepared, as set forth in the following examples, by coupling the appropriate 1-(2 - vinylsulfonylethyl) - 1,2,3,4 - tetrahydroquinoline coupling component with the appropriate diazotized aniline in accordance with conventional procedures.

EXAMPLES OF THE DYES

Example 1

An amount of 6.9 g. of p-nitroaniline was dissolved in 5.4 ml. conc. sulfonic acid and 12.6 ml. water. This solution was poured onto 50 g. of ice and then a solution of 3.6 g. sodium nitrite in 8 ml. H₂O was added all at once. The diazotization was stirred at 5° for 1 hr., resulting in almost complete solution. After filtration, the diazonium solution was added to a chilled solution of 15.35 g. of 2,2,4,7-tetramethyl - 1 - (2-vinylsulfonylethyl)-1,2,3,4-tetrahydroquinoline in 100 ml. 1:5 acid (1 part propionic acid:5 parts acetic acid). The coupling was neutralized with solid ammonium acetate to brown on Congo red paper and allowed to couple 1.5 hr. It was drowned in water, filtered, washed and dried. The product dyes polyester nylon and wool fibers deep red shades showing good wash fastness on polyamides. The dye has the structure:

Example 2

An amount of 6.38 g. of p-chloroaniline was dissolved in 50 ml. water and 15 ml. concentrated hydrochloric acid. The solution was cooled at 2° C. and a solution of 3.6 g. sodium nitrite in 10 ml. water was added. After stirring for 1 hr. at 0–5° C. this solution was added to a chilled solution of 13.95 g. of 2,7-dimethyl - 1 - (2-vinylsulfonylethyl) - 1,2,3,4 - tetrahydroquinoline in 100 ml. 1:5 acid. This was neutralized with ammonium acetate to brown on Congo red paper and allowed to couple for 1.25 hr. It was drowned in water, filtered, washed with water and dried. The product dyes polyester, polyamide and cellulose acetate fibers orange-yellow shades and shows good light fastness and excellent washfastness when dyed on nylon and wool fibers. The dye has the structure:

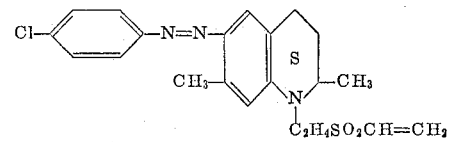

Example 3

Nitrosyl sulfuric acid was prepared by careful addition of 0.72 g. sodium nitrite to 5 ml. sulfuric acid below 80° C. The solution was cooled to 15° C. and 10 ml. 1:5 acid (1 part propionic acid:5 parts acetic acid) was added below 20° C. The resulting solution was cooled to 3° C. and 2.16 g. 2-methylsulfonyl - 4 - nitroaniline was added below 5° C. An additional 10 ml. of 1:5 acid was added and the reaction mixture stirred for 2 hr. The diazonium solution was then added to a chilled solution of 3.07 g. of 2,2,4,7-tetramethyl - 1 - β - vinylsulfonylethyl-1,2,3,4-tetrahydroquinoline in 20 ml. 1:5 acid. After neutralization with ammonium acetate to a brown color on Congo red paper the coupling was continued for 1.5 hr. The reaction mixture was drowned in water, filtered, and washed with water. The product obtained gives lightfast red-violet dyeings on polyester fibers. It has the structure:

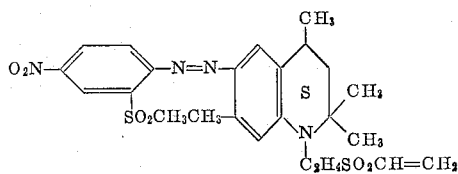

Example 4

Using the same procedure and quantities of reagents described in Example 3 and substituting 2.05 g. 2-chloro-4-methylsulfonylaniline for the 2-methylsulfonyl - 4 - nitroaniline, the resulting diazonium solution was coupled with 3.07 g. 2,2,4,7-tetramethyl - 1 - β - vinylsulfonylethyl-1,2,3,4-tetrahydroquinoline in 20 ml. 1:5 acid. The dye obtained gives red orange dyeings on cellulose acetate, polyesters and nylon which show outstanding light and wash fastness on nylon. It has the structure:

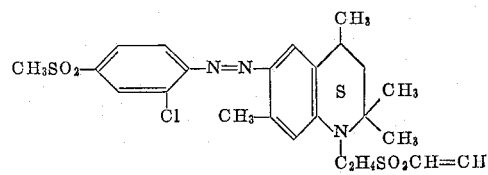

Example 5

Using the same procedure and quantities of reagents as described in Example 3 and substituting 1.61 g. m-trifluoromethylaniline for the 2-methylsulfonyl-4-nitroaniline, the resulting diazonium solution was coupled with 3.07 g. 2,2,4,7-tetramethyl-β-vinylsulfonylethyl 1,2,3,4-tetrahydroquinoline. The dye obtained gives light fast yellow dyeings on cellulose acetate, polyesters and polyamides. It shows outstanding fastness to washing when dyed on nylon. The dye has the structure:

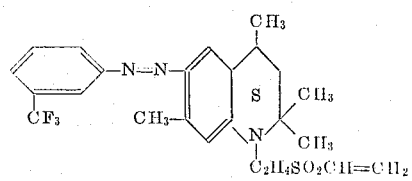

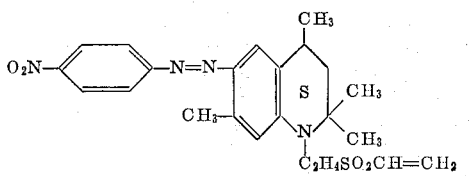

Example 6

Using the same procedure and quantities of reagents described in Example 2 and substituting 5.35 p-toluidine for the p-chloroaniline the resulting diazonium solution was coupled with 15.35 g. of 2,2,4,7-tetramethyl-1-β-vinylsulfonylethyl-1,2,3,4-tetrahydroquinoline in 100 ml. 1:5 acid. The dye obtained gives bright yellow dyeings on cellulose acetate, polyesters, polyamides and wool. The dyeings on nylon show outstanding light and wash fastness. The dye has the structure:

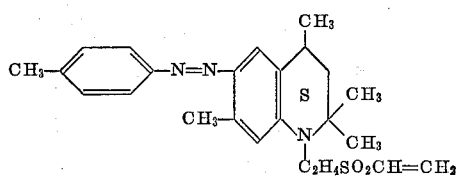

Example 7

A diazonium solution is prepared as in Example 2 from p-chloroaniline using the same quantities of reagents and was coupled with 15.35 g. 2,2,4,7-tetramethyl-1-β-vinylsulfonylethyl-1,2,3,4-tetrahydroquinoline in 100 ml. 1:5 acid. The dye obtained gives bright yellow dyeings on cellulose acetate, polyesters and nylon showing outstanding wash and light fastness on the latter fiber. It has the structure:

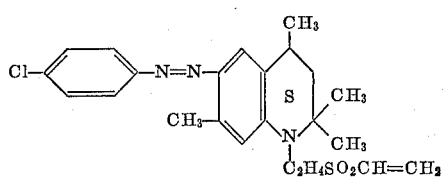

Example 8

Using the procedure and the same quantities of reagents described in Example 3 and substituting 1.35 g. p-aminoacetophenone for the 2-methylsulfonyl-4-nitroaniline the resulting diazonium solution was coupled with 3.07 g. 2,2,4,7-tetramethyl-1-β-vinylsulfonylethyl - 1,2,3,4 - tetrahydroquinoline. The resulting dye gives orange dyeings on polyesters, polyamides, and cellulose acetate with outstanding light fastness and wash fastness on nylon. The dye has the structure:

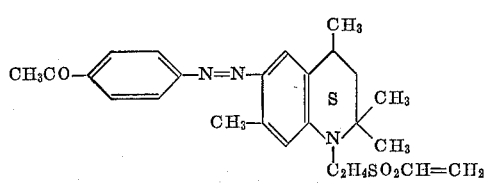

Example 9

A diazonium solution was prepared from 1.35 g. p-aminoacetophenone as in Example 8 and coupled with 2.79 g. of 2,7-dimethyl-1-β-vinylsulfonylethyl-1,2,3,4-tetrahydroquinoline in 20 ml. 1:5 acid to give an orange dye. This product gives orange dyeings on cellulose acetate, polyamides and polyesters which show outstanding fastness on nylon to washing and light. It has the structure:

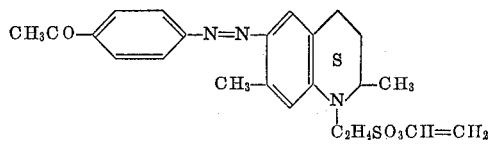

Example 10

Using the procedure and the same quantities of reagents as in Example 3 and substituting 2.49 g. 2,4-bismethylsulfonylaniline for the 2-methylsulfonyl-4-nitroaniline the resulting diazonium solution was coupled with 3.07 g. 2,2,4,7-tetramethyl-1-β-vinylsulfonylethyl - 1,2,3,4 - tetrahydroquinoline in 20 ml. 1:5 acid. The dye obtained gives pink dyeings on cellulose acetate, polyesters, and nylon. It shows outstanding wash and light fastness on nylon. It has the structure:

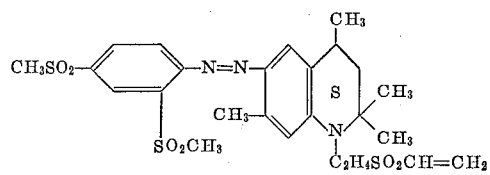

Example 11

Using the procedure and same quantities of reagents as in Example 3 and substituting 1.71 g. p-methylsulfonylaniline for the 2-methylsulfonyl-4-nitroaniline, the resulting diazonium solution was coupled with 3.07 g. 2,2,4,7-tetramethyl-1-β-vinylsulfonylethyl - 1,2,3,4 - tetrahydroquinoline in 20 ml. 1:5 acid. The dye obtained gives bright orange dyeings on polyester, cellulose acetate and nylon fibers which have outstanding light and wash fastness on the latter fiber. The dye has the structure:

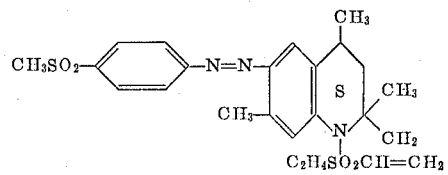

The azo compounds of the following table were prepared by the method illustrated in Examples 1–11, above. Thus, the appropriate diazotized aniline was coupled with the vinylsulfonylethyl tetrahydroquinoline coupler of Formula II to obtain dyes having the general formula

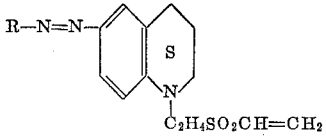

wherein R and the tetrahydroquinoline nucleus are substituted as described in the table.

TABLE

| Example | Substituent on R | Tetrahydroquinoline Radical | | Color |
|---|---|---|---|---|
| | | Substituent on Heterocyclic Ring | Substituent on Aromatic Ring | |
| 12 | p-$NO_2$ | 2-methyl | H | Red. |
| 13 | p-$NO_2$ | None | None | Orange-red. |
| 14 | p-$NO_2$ | 2-methyl | 7-methyl | Red. |
| 15 | p-$NO_2$ | 2-isopropyl | do | Red. |
| 16 | p-$NO_2$ | do | 7-chloro | Red. |
| 17 | p-$NO_2$ | do | 7-methoxy | Red. |
| 18 | p-$NO_2$ | do | 7-acetamido | Red. |
| 19 | p-$NO_2$ | do | 5,7-dichloro | Red. |
| 20 | p-$NO_2$ | 2,2,4-trimethyl-4-chloro | 7-methyl | Red. |
| 21 | p-$NO_2$ | 2,2,4-trimethyl-4-methoxy | do | Red. |
| 22 | p-$NO_2$ | 2,2,4-trimethyl-4-acetamido | do | Red. |
| 23 | 2-$NO_2$-4-Cl | 2,2,4-trimethyl | do | Red-violet. |
| 24 | 4-$NO_2$-2-Cl | do | do | Orange-red. |
| 25 | 2,6-di-Cl-4-$NO_2$ | do | do | Red-brown. |
| 26 | None | do | do | Yellow. |
| 27 | p-CN | do | do | Orange. |
| 28 | p-$SO_2NH_2$ | do | do | Red. |
| 29 | p-$CF_3$ | do | do | Red. |
| 30 | p-$SO_2N(CH_3)_2$ | do | do | Orange. |
| 31 | 2,4-di-$NO_2$-6-$C_2H_5NHSO_2$ | do | do | Blue. |
| 32 | 4-$CH_3CO$-2-Cl | do | do | Orange. |
| 33 | p-CHO | do | do | Orange-yellow. |
| 34 | p-$\begin{smallmatrix}CH_2-CO\\ \phantom{xx}\diagdown\\ \phantom{xxxx}N-\\ \phantom{xx}\diagup\\ CH_2-CO\end{smallmatrix}$ | do | do | Yellow. |
| 35 | p-$C_2H_5O\overset{O}{\underset{\|}{C}}$— | do | do | Orange. |
| 36 | p-$H_2N\overset{O}{\underset{\|}{C}}$— | do | do | Do. |
| 37 | p-$CH_3O$— | do | do | Yellow. |
| 38 | p-⟨◯⟩NHCO— | do | do | Yellow-orange. |
| 39 | p-NCS— | do | do | Do. |
| 40 | p-$CH_3S$— | do | do | Yellow. |
| 41 | p-⟨◯⟩-O— | do | do | Do. |
| 42 | p-⟨◯⟩— | do | do | Do. |
| 43 | p-$(CH_3)_2N$— | do | do | Do. |
| 44 | p-⟨◯⟩NH— | do | do | Do. |
| 45 | p-⟨◯⟩N($CH_3$)— | do | do | Do. |
| 46 | p-⟨◯⟩CO— | do | do | Orange. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compound into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material. The substituents on R and the tetrahydroquinoline ring serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula

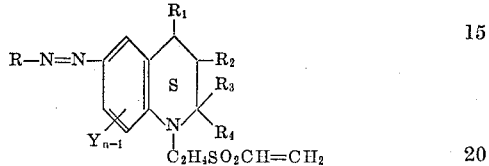

wherein
R is a monocyclic carbocylic aromatic group of the benzene series;
$R_1$, $R_2$, $R_3$ and $R_4$ are the same or different and each is hydrogen or lower alkyl;
Y is lower alkyl, lower alkoxy, chlorine or bromine; and
$n$ is a positive integer from 1 to 4.

2. A water-insoluble azo compound having the formula

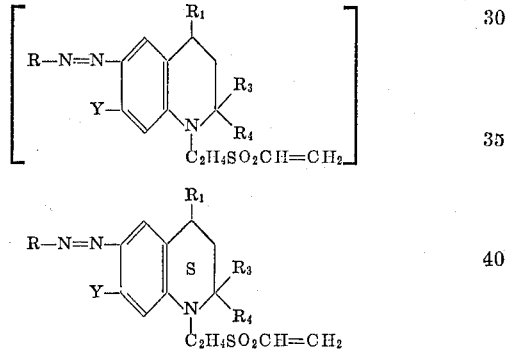

wherein
R is phenyl or phenyl substituted with lower alkyl, chloro, bromo, trifluoromethyl, lower alkylsulfonyl, lower alkanoyl, formyl, cyano, lower carbalkoxy, or carbamoyl; and
$R_1$, $R_3$, $R_4$ and Y are the same or different and each is hydrogen or lower alkyl.

3. The dye:

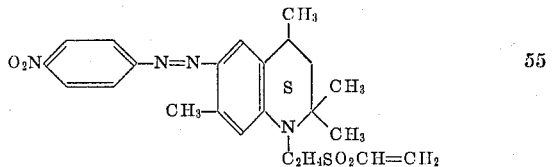

4. The dye:

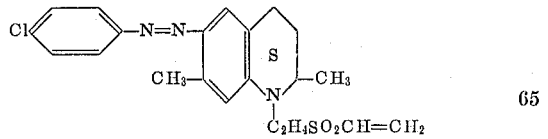

5. The dye:

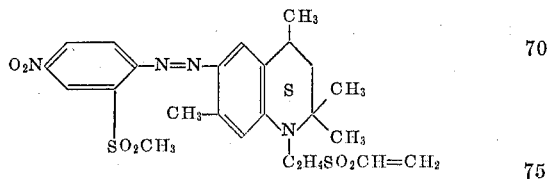

6. The dye:

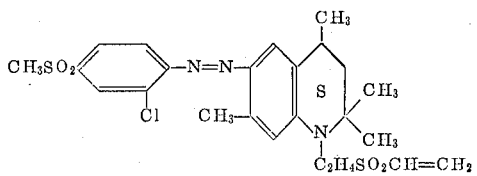

7. The dye:

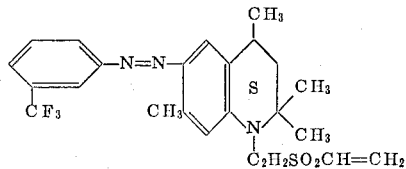

8. The dye:

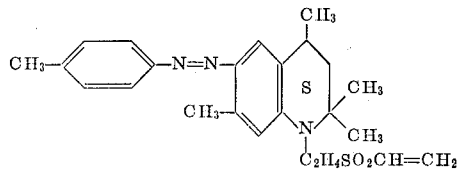

9. The dye:

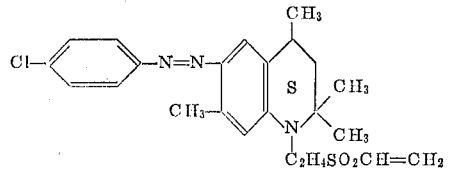

10. The dye:

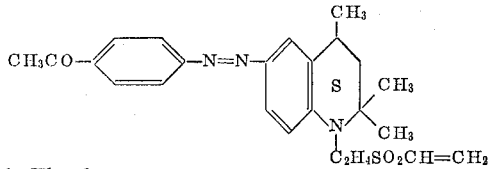

11. The dye:

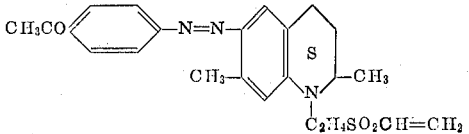

12. The dye:

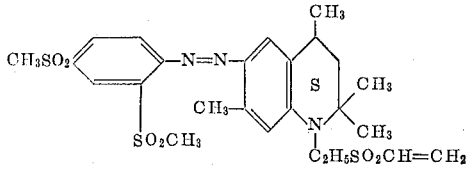

13. The dye:

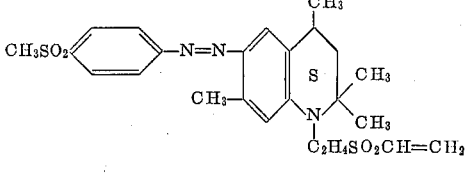

References Cited

UNITED STATES PATENTS

| | | | |
|---|---|---|---|
| 1,969,463 | 8/1934 | Holzach et al. | 260—155 |
| 2,161,627 | 6/1939 | Knight | 260—155 |
| 2,529,924 | 11/1950 | Dickey | 260—155 |
| 2,659,719 | 11/1953 | Dickey et al. | 260—155 |
| 2,746,952 | 5/1956 | Dickey et al | 260—158 |

FLOYD D. HIGEL, *Primary Examiner.*